US009786076B2

(12) United States Patent
Furuya

(10) Patent No.: US 9,786,076 B2
(45) Date of Patent: Oct. 10, 2017

(54) IMAGE COMBINING APPARATUS, IMAGE COMBINING METHOD AND NON-TRANSITORY COMPUTER READABLE MEDIUM FOR STORING IMAGE COMBINING PROGRAM

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 14/797,194

(22) Filed: Jul. 13, 2015

(65) Prior Publication Data
US 2016/0063746 A1 Mar. 3, 2016

(30) Foreign Application Priority Data

Aug. 27, 2014 (JP) ................................ 2014-172361

(51) Int. Cl.
*G06K 9/62* (2006.01)
*G06T 11/60* (2006.01)
(52) U.S. Cl.
CPC .......... *G06T 11/60* (2013.01); *G06T 2200/24* (2013.01)
(58) Field of Classification Search
None
See application file for complete search history.

(56) References Cited

U.S. PATENT DOCUMENTS

| 6,853,461 B1* | 2/2005 | Shiimori | G06Q 30/0641 358/1.15 |
| 8,922,695 B2* | 12/2014 | He | G02B 13/06 348/222.1 |
| 2003/0174891 A1* | 9/2003 | Wenzel | G06T 7/0004 382/209 |
| 2005/0117948 A1* | 6/2005 | Hatta | H04N 1/00132 400/62 |
| 2006/0097062 A1* | 5/2006 | Cheong | G06K 19/06037 235/494 |

(Continued)

FOREIGN PATENT DOCUMENTS

| GB | 2342026 A * | 3/2000 | ............ G06T 13/40 |
| JP | 4090926 | 5/2008 | |

(Continued)

OTHER PUBLICATIONS

"Office Action of Japan Counterpart Application" with machine English translation, dated Sep. 20, 2016, p. 1-p. 6.

*Primary Examiner* — Iman K Kholdebarin
(74) *Attorney, Agent, or Firm* — Jianq Chyun IP Office

(57) ABSTRACT

A template image is found and a target image is combined with a combining area of the found template image. The template image found has first template image analysis information, which is of a type identical with that of first target image analysis information in target image analysis information consisting of the brightness, contrast, saturation, hue, color balance and spatial frequency of the target image, and for which the degree of resemblance is equal to or greater than a first threshold value, and moreover has second template image analysis information, which is of a type identical with that of second target image analysis information in target image analysis information, and for which the degree of resemblance is less than a second threshold value.

10 Claims, 17 Drawing Sheets

(56) References Cited

U.S. PATENT DOCUMENTS

| | | | | |
|---|---|---|---|---|
| 2007/0139436 A1* | 6/2007 | Yamakado | ............ | G06T 11/001 345/589 |
| 2008/0152231 A1* | 6/2008 | Gokturk | ............ | G06F 17/30256 382/209 |
| 2009/0116749 A1* | 5/2009 | Cristinacce | ............ | G06K 9/621 382/195 |
| 2009/0153666 A1* | 6/2009 | Takeuchi | .............. | G01S 3/7864 348/169 |
| 2010/0310127 A1* | 12/2010 | Ito | ........................... | G06T 7/248 382/103 |
| 2012/0194505 A1* | 8/2012 | Beck | ...................... | G09G 5/363 345/419 |
| 2012/0207397 A1* | 8/2012 | Nagatomo | ........... | G06K 9/6203 382/218 |
| 2013/0223758 A1* | 8/2013 | Hou | ...................... | G06T 3/4038 382/274 |

FOREIGN PATENT DOCUMENTS

| | | |
|---|---|---|
| JP | 4211560 | 1/2009 |
| JP | 2009-031855 | 2/2009 |
| JP | 4978043 | 7/2012 |
| JP | 2012-244226 | 12/2012 |
| JP | 2013-081208 | 5/2013 |

\* cited by examiner

*Fig. 7*

TARGET IMAGE ANALYSIS INFORMATION TABLE

| TARGET IMAGE | BRIGHTNESS | CONTRAST | SATURATION | HUE | COLOR BALANCE | SPATIAL FREQUENCY |
|---|---|---|---|---|---|---|
| P 1 | L 8 | L 3 | L 3 | — | — | — |

Fig. 8

IMPRESSION VS. IMAGE ANALYSIS INFORMATION TABLE

| IMAGE ANALYSIS INFORMATION / IMPRESSION | BRIGHTNESS | CONTRAST | SATURATION | HUE | COLOR BALANCE | SPATIAL FREQUENCY | SCENE |
|---|---|---|---|---|---|---|---|
| CUTE | EQUAL TO OR GREATER THAN L7 | L3 TO L5 | L3 TO L5 | — | — | — | FAIR |
| GENTLE | EQUAL TO OR GREATER THAN L7 | L3 TO L6 | L3 TO L6 | --- | --- | --- | --- |
| INVIGORATING | EQUAL TO OR GREATER THAN L8 | L5 TO L8 | L5 TO L8 | --- | --- | --- | --- |
| --- | --- | --- | --- | --- | --- | --- | --- |

*Fig. 9*

TEMPLATE IMAGE ANALYSIS INFORMATION TABLE

| TEMPLATE NO. | IMPRESSION | IMAGE ANALYSIS INFORMATION | | | | | | |
|---|---|---|---|---|---|---|---|---|
| | | BRIGHTNESS | CONTRAST | SATURATION | HUE | COLOR BALANCE | SPATIAL FREQUENCY | SCENE |
| No. 1 | CUTE/ GENTLE | L8 | L5 | L4 | --- | --- | --- | --- |
| No. 2 | GENTLE/ INVIGORATING | L8 | L6 | L4 | --- | --- | --- | --- |
| No. 3 | STYLISH | L3 | L2 | L7 | --- | --- | --- | --- |
| No. 4 | MODERN | L3 | L8 | L8 | --- | --- | --- | --- |
| --- | --- | --- | --- | --- | --- | --- | --- | --- |

Fig. 12

IMPRESSION VS. CORRECTION TABLE

| IMPRESSION \ TYPE OF CORRECTION | BRIGHTNESS | CONTRAST | SATURATION | HUE | - - - |
|---|---|---|---|---|---|
| CUTE | +L1 | +L1 | +L1 | - - - | - - - |
| PRETTY | +L2 | +L1 | +L2 | - - - | - - - |
| ⋮ | ⋮ | ⋮ | ⋮ | ⋮ | ⋮ |

Fig. 14

SCENE DETERMINATION TABLE

| IMAGE-CAPTURE TIME | IMAGE-CAPTURE PLACE | SCENE |
|---|---|---|
| July 31, 12:00, 2014 | MT. FUJI | FAIR |
| - - - | - - - | CLOUDY |
| - - - | - - - | RAIN |

… (1) …

IMAGE COMBINING APPARATUS, IMAGE COMBINING METHOD AND NON-TRANSITORY COMPUTER READABLE MEDIUM FOR STORING IMAGE COMBINING PROGRAM

CROSS-REFERENCE TO RELATED APPLICATIONS

The present application claims priority under 35 U.S.C. §119 to Japanese Patent Application No. 2014-172361 filed Aug. 27, 2014. Each of the above application(s) is hereby expressly incorporated by reference, in its entirety, into the present application.

BACKGROUND

Technical Field

This disclosure relates to an image combining apparatus and image combining method as well as a non-transitory computer readable medium for storing an image combining program.

Description of the Related Art

Image combining systems that have been realized so far enable a user to generate a desired composite image by pasting an image of interest onto a template as in the manner of a postcard, electronic album or photo book. For example, there is a technique through which the tint of an album mount is adjusted in accordance with the tint of an image of interest to thereby obtain a sense of harmony between the tints of the image of interest and album mount (Patent Document 1), as well as a system in which a keyword expressing a feeling or sensation is set in conformity with a registered image and the corresponding image processing is executed (Patent Document 2). Further, there is a method of evaluating design-image information, namely a method of evaluating the impression given to a human being by media which provide product information (Patent Document 3).

Furthermore, there is a technique whereby a decorative image template, which includes an internal frame area the color of which can be changed and an external frame area placed outside the internal frame area, is added to an image of interest (Patent Document 4), a technique for analyzing face information and extracting a template image from the face information analyzed (Patent Document 5), and a system in which image-quality adjustment processing, which is applied to an image of interest in accordance with the image type of a frame, is decided (Patent Document 6).

Patent Document 1: Japanese Patent Application Laid-Open No. 2013-81208.

Patent Document 2: Japanese Patent No. 4090926.

Patent Document 3: Japanese Patent No. 4978043.

Patent Document 4: Japanese Patent No. 4211560.

Patent Document 5: Japanese Patent Application Laid-Open No. 2012-244226.

Patent Document 6: Japanese Patent Application Laid-Open No. 2009-31855.

However, there are instances where results in conformity with user preference are not necessarily obtained when the tint of an album mount is adjusted in accordance with the tint of an image of interest as described in Patent Document 1 or when image processing corresponding to a sensation-expressing keyword conforming to a registered image is executed as described in Patent Document 2. Further, according to the description rendered in Patent Document 3, since this technique is for evaluating an impression, a composite image in agreement with user preference cannot be obtained. Furthermore, in a case where an image can only be applied to a decorative image template that includes an internal frame and an external frame, as described in Patent Document 4, it is not possible to deal with a case where the user prefers a template other than such a template. In a case where a template image is extracted from a face image, as set forth in Patent Document 5, a template image cannot be extracted if the image of interest does not contain a face image. Furthermore, in a system in which image-quality adjustment processing, which is applied to an image of interest in accordance with the image type of a frame, is decided as set forth in Patent Document 6, it is difficult to find a desired frame from among many frames.

SUMMARY

The present disclosure finds a template image suitable for a composite image.

An image combining apparatus according to the present disclosure comprises: a target image analysis information acquisition device (target image analysis information acquisition means) for acquiring target image analysis information which includes at least two items from among brightness, contrast, saturation, hue, color balance and spatial frequency of a target image to be combined with a template image; a template image detection device (template image detection means) for finding a template image for which a first degree of resemblance is equal to or greater than a first threshold value, wherein the first degree of resemblance is resemblance between first target image analysis information in the target image analysis information acquired by the target image analysis information acquisition device and first template image analysis information, which is of a type identical with that of the first target image analysis information, in template image analysis information consisting of brightness, contrast, saturation, hue, color balance and spatial frequency of the template image, and moreover for which a second degree of resemblance is less than a second threshold value, wherein the second degree of resemblance is resemblance between second target image analysis information in the target image analysis information acquired by the target image analysis information acquisition device and second template image analysis information, which is of a type identical with that of the second target image analysis information, in the template image analysis information; and a combining device (combining means) for combining the target image with the template image found by the template image detection device.

The present disclosure also provides an image combining method suited to the above-described image combining apparatus. Specifically, the present disclosure provides an image combining method comprising steps of: acquiring target image analysis information which includes at least two items from among brightness, contrast, saturation, hue, color balance and spatial frequency of a target image to be combined with a template image; finding a template image for which a first degree of resemblance is equal to or greater than a first threshold value, wherein the first degree of resemblance is resemblance between first target image analysis information in the acquired target image analysis information and first template image analysis information, which is of a type identical with that of the first target image analysis information, in template image analysis information consisting of brightness, contrast, saturation, hue, color balance and spatial frequency of the template image, and moreover for which a second degree of resemblance is less than a second threshold value, wherein the second degree of resemblance is resemblance between second target image analysis information in the acquired target image analysis information and second template image analysis information, which is of a type identical with that of the second target image analysis information, in the template image analysis information; and combining the target image with the template image found.

The present disclosure also provides a non-transitory computer readable medium for storing an image combining program.

The image combining apparatus may further comprise: a first target image impression determination device (first target image impression determination means) for determining one or multiple impressions given by the target image based upon the target image analysis information acquired by the target image analysis information acquisition device. In this case, the template image detection device would find, by way of example, a template image for which the first degree of resemblance is equal to or greater than the first threshold value, the second degree of resemblance is less than the second threshold value and, moreover, which gives the impression determined by the first target image impression determination device.

The image combining apparatus may further comprise: an image-capture information acquisition device (image-capture information acquisition means) for acquiring image-capture information which is at least one of image-capture time or image-capture place of the target image; and a second target image impression determination device (second target image impression determination means) for determining one or multiple impressions given by the target image, based upon the image-capture information acquired by the image-capture information acquisition device. In this case, the template image detection device would find, by way of example, a template image for which the first degree of resemblance is equal to or greater than the first threshold value, the second degree of resemblance is less than the second threshold value and, moreover, which gives the impression determined by the second target image impression determination device.

The image combining apparatus may further comprise: an image-capture information acquisition device (image-capture information acquisition means) for acquiring image-capture information which is at least one of image-capture time or image-capture place of the target image; an image-capture scene determination device (image-capture scene determination means) for determining an image-capture scene based upon the image-capture information acquired by the image-capture information acquisition device; and a third target image impression determination device (third target image impression determination means) for determining one or multiple impressions given by the target image, based upon the image-capture scene determined by the image-capture scene determination device. In this case, the template image detection device would find, by way of example, a template image for which the first degree of resemblance is equal to or greater than the first threshold value, the second degree of resemblance is less than the second threshold value and, moreover, which gives the impression determined by the third target image impression determination device.

The image combining apparatus may further comprise: a target image correction device (target image correction means) for subjecting the target image to a correction that causes the target image to approximate the impression of the template image detected by the template image detection device.

In a case where a correction method has been decided beforehand in conformity with the impression given by the template image detected by the template image detection device, it is preferred that the target image correction device subject the target image to a correction by the correction method decided beforehand in conformity with the template image detected by the template image detection device.

The image combining apparatus may further comprise: a principal subject image information acquisition device (principal subject image information acquisition means) for acquiring information representing position of a principal subject in the target image; and an aspect ratio calculation device (aspect ratio calculation means) for calculating aspect ratio of a combining area of the template image from the position of the principal subject represented by the principal subject image position information acquired by the principal subject image information acquisition device.

In this case, the template image detection device would find, by way of example, a template image for which the first degree of resemblance is equal to or greater than the first threshold value, the second degree of resemblance is less than the second threshold value and, moreover, which has a combining area having the aspect ratio calculated by the aspect ratio calculation device.

The image combining apparatus may further comprise: a trimming device (trimming means) for trimming the target image to the aspect ratio calculated by the aspect ratio calculation device. In this case, the combining device would combine the target image, which has been trimmed by the trimming device, with the combining area of the template image found by the template image detection device.

By way of example, the template image detection device may find a template image from among template images in which a combining area with which the target image is to be combined has been formed within a single frame or from among template images in which at least a portion of the periphery of a combining area with which the target image is to be combined is open.

In accordance with the present disclosure, target image analysis information that includes at least two items from among brightness, contrast, saturation, hue, color balance and spatial frequency of a target image to be combined with a template image is acquired. A template image for which a first degree of resemblance is equal to or greater than a first threshold value and, moreover, for which a second degree of resemblance is less than a second threshold value, is found. The first degree of resemblance is the resemblance between first target image analysis information in the acquired target image analysis information and first template image analysis information, which is of a type identical with that of the first target image analysis information, in template image analysis information consisting of the brightness, contrast, saturation, hue, color balance and spatial frequency of the template image. The second degree of resemblance is the resemblance between second target image analysis information and second template image analysis information of the same type. The target image is combined with the template image found.

In accordance with the present disclosure, a template image is found. The template image has a characteristic close to the characteristic represented by the first target image analysis information but has a characteristic remote from the characteristic represented by the second target image analysis information. With only close resemblance between the characteristic of a target image and the characteristic of a template image, the impact of the overall composite image obtained by combining the target image with the template image will be weak and often a composite image in line with user preference will not be obtained. In accordance with the present disclosure, there is found such a template image that a first characteristic (first target image analysis information or first template image analysis information) of the target image and of the template image have close resemblance while a second characteristic (second target image analysis information or second template image analysis information) of the target image and of the template image do not have close resemblance. By combining the target image with such a template image, the composite image obtained will have a strong impact upon the user and hence will be in line with user preference.

Other features and advantages of the present disclosure will be apparent from the following description taken in conjunction with the accompanying drawings, in which like reference characters designate the same or similar parts throughout the figures thereof.

BRIEF DESCRIPTION OF THE DRAWINGS

FIG. 7 illustrates the result of target image analysis;
FIG. 8 is an example of a table illustrating impressions versus image analysis information;
FIG. 9 is an example of a template image analysis information table;
FIG. 12 is an example of a table illustrating impressions versus corrections;
FIG. 14 is an example of a scene determination table.

DESCRIPTION OF EMBODIMENTS

Embodiments of the present disclosure will now be described in detail with reference to the accompanying drawings.

Figure 1:
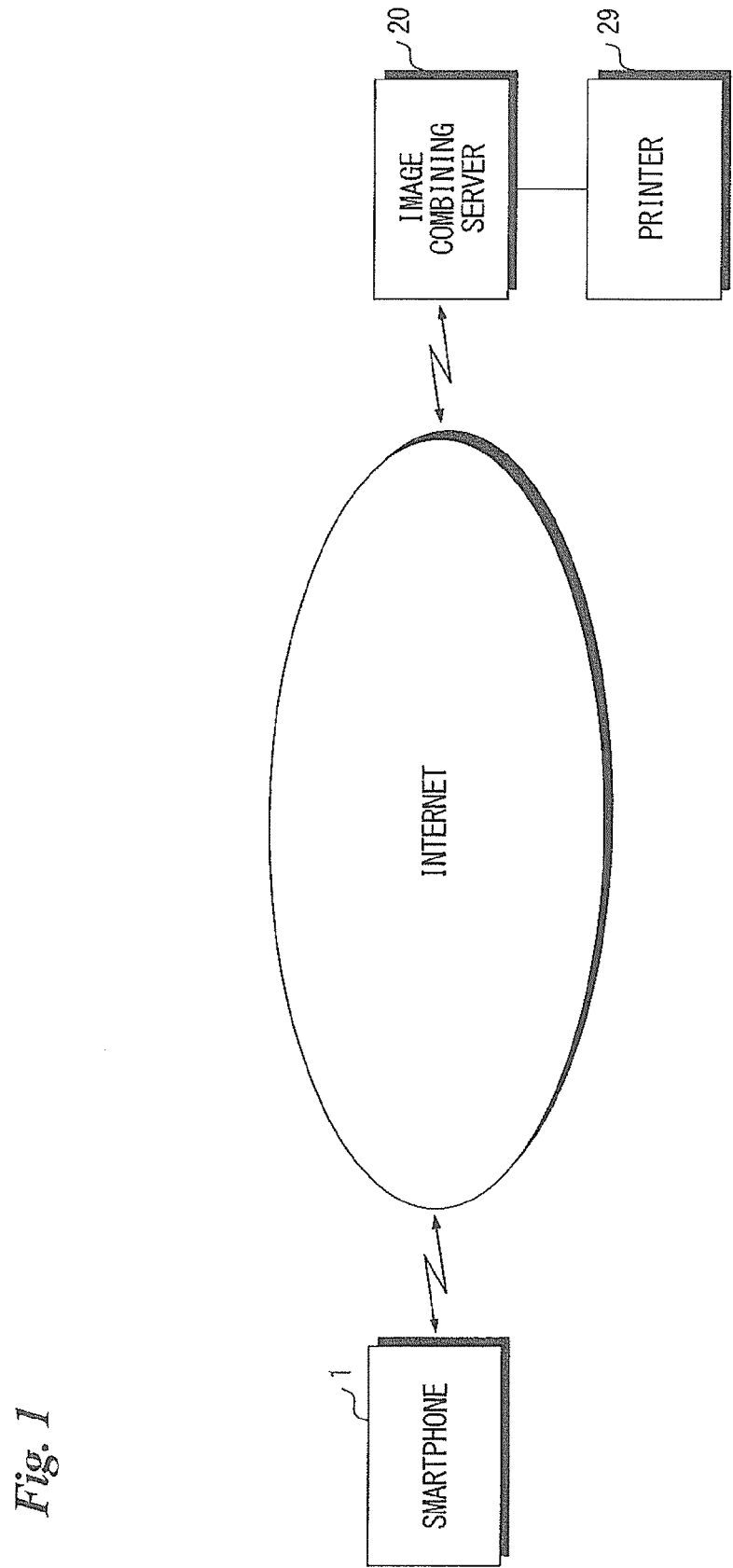
FIG. 1 illustrates an overview of an image combining system.

FIG. 1 illustrates an embodiment of the present disclosure and shows an overview of an image combining system.

In this embodiment, a case where a target image is combined with a template image to thereby generate the composite image of a postcard will be described. However, the present disclosure is not limited to the generation of a postcard and can be applied to all systems of the kind that generate a composite image by combining a target image with a template image as in the manner of an electronic album or photo book.

The image combining system includes a smartphone (a multifunction mobile telephone) 1 and an image combining server (image combining apparatus) 20 that are capable of communicating with each other via a network such as the Internet. It goes without saying that the system can utilize a client computer or the like instead of the smartphone 1. Connected to the image combining server 20 is a printer 29 for printing a postcard from image data representing a composite image generated in the image combining server 20.

Figure 2:
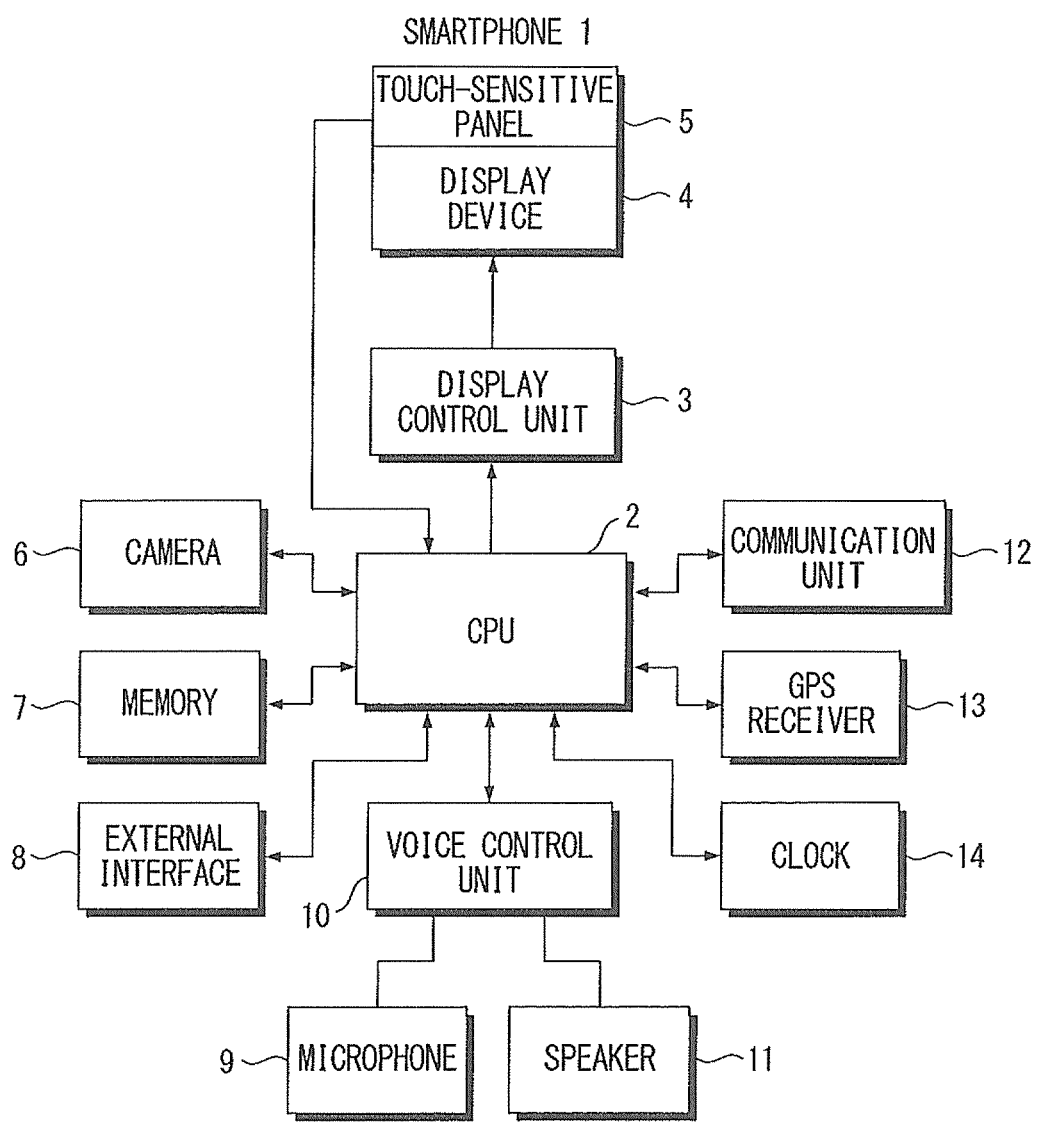
FIG. 2 is a block diagram illustrating the electrical configuration of a smartphone.

FIG. 2 is a block diagram illustrating the electrical configuration of the smartphone 1.

The overall operation of the smartphone 1 is controlled by a CPU 2.

The smartphone 1 includes a display device 4 controlled by a display control unit 3. A touch-sensitive panel 5 has been formed on the display screen of the display device 4. A command supplied from the touch-sensitive panel 5 is input to the CPU 2. The smartphone 1 further includes a camera 6, a memory 4 for storing data temporarily, and an external interface 8 for connecting to external devices. The smartphone 1 further includes a microphone 9, a voice control unit 10 and a speaker 11. The smartphone 1 further includes a communication unit 12 for connecting to the Internet as mentioned above, a GPS (Global Positioning System) receiver 13 for detecting the location of the smartphone 1, and a clock 14.

Figure 3:
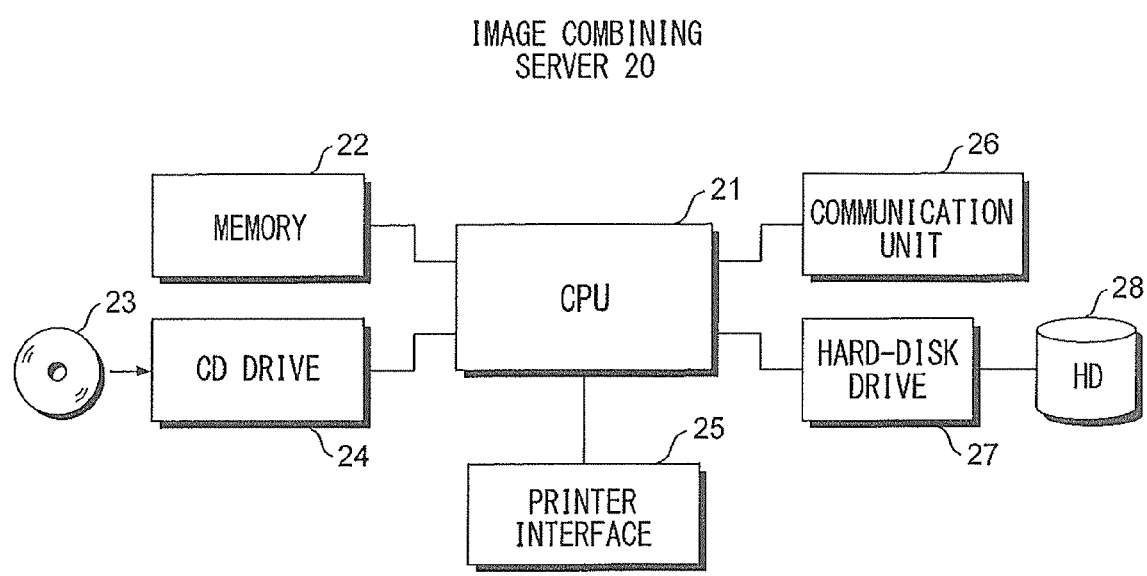
FIG. 3 is a block diagram illustrating the electrical configuration of an image combining server.

FIG. 3 is a block diagram illustrating the electrical configuration of the image combining server 20.

The overall operation of the image combining server 20 is controlled by a CPU 21.

The image combining server 20 includes a memory 22 for storing data temporarily, a compact-disc drive 24 for accessing a compact disc 23, and a printer interface 25 for connecting to the printer 29. The image combining server 20 further includes a hard disk 28 and a hard-disk drive 27 for accessing the hard disk 28.

The compact disc (recording medium) 23 on which a program for controlling operation, described later, has been stored is loaded in the image combining server 20 and the program that has been stored on the compact disc 23 is read by the compact-disc drive 24. By installing the read program in the image combining server 20, the image combining server 20 operates in a manner described later. It may be arranged so that the program that controls the image combining server 20 is received by being transmitted over the Internet instead of being read from a recording medium such as the compact disc 23.

Figure 4:
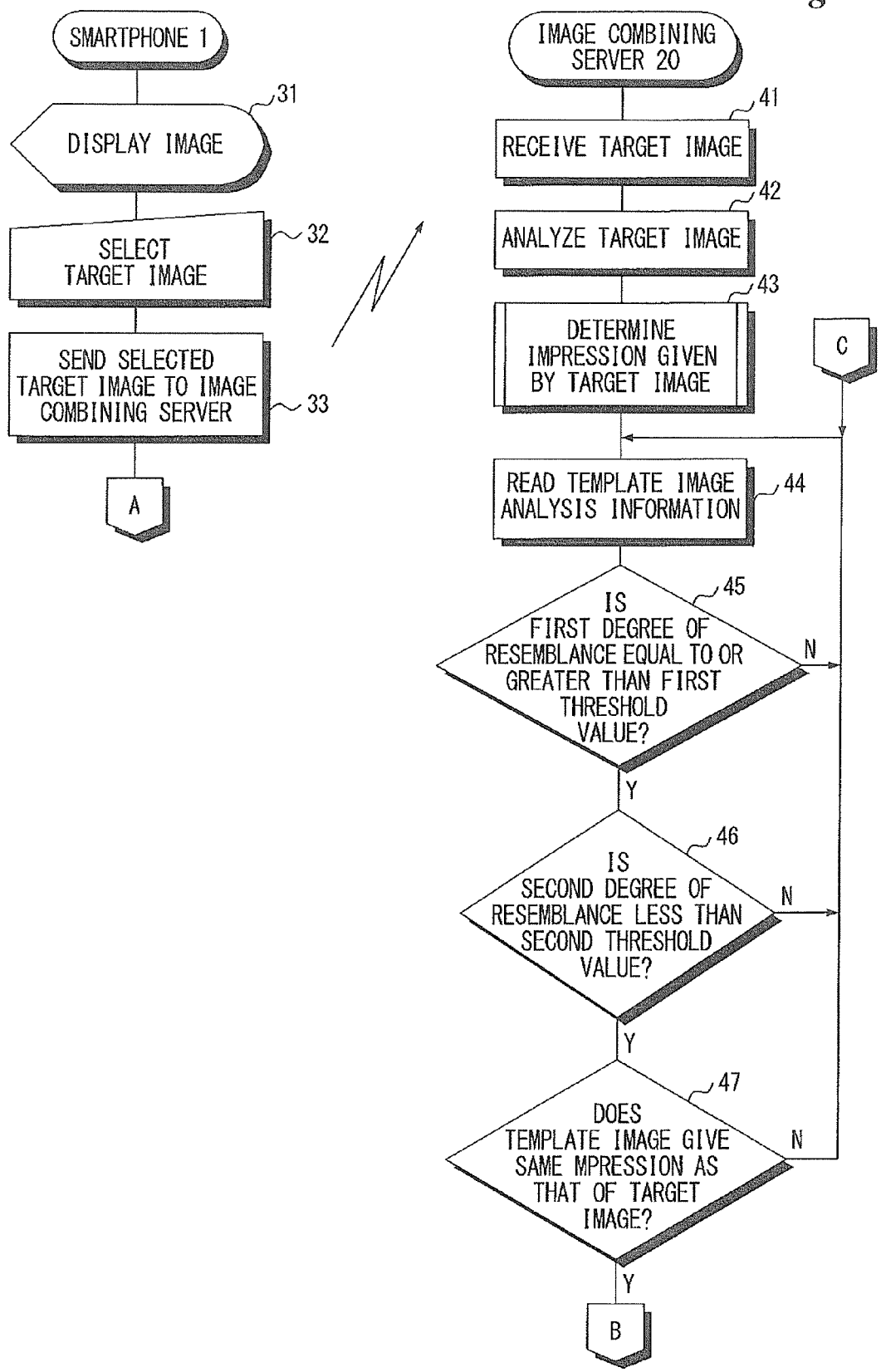
FIGS. 4 and 5 are flowcharts illustrating processing executed by the image combining system.
Figure 5:
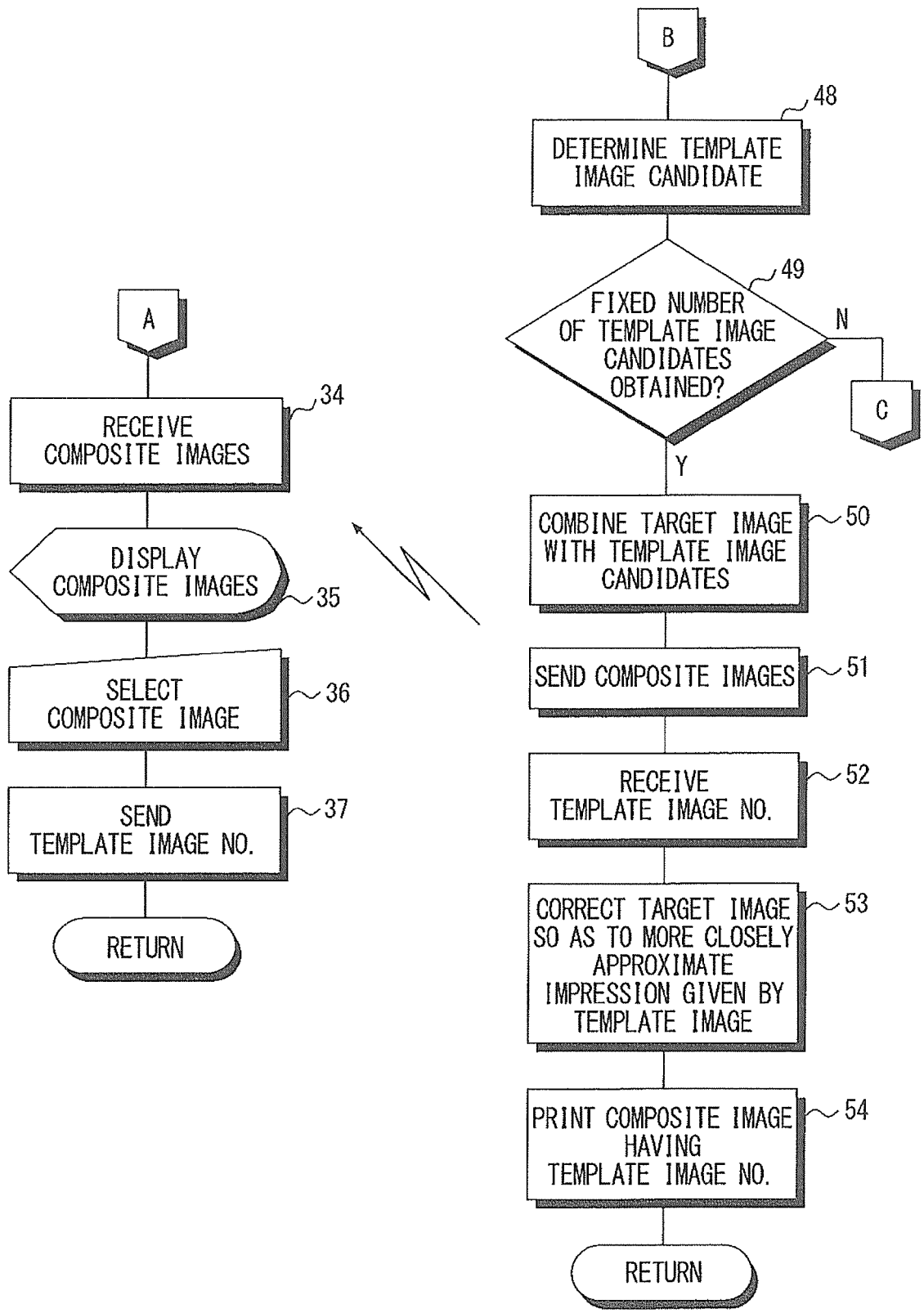

FIGS. 4 and 5 are flowcharts illustrating processing executed by the image combining system.

In the image combining system according to this embodiment, a composite image is generated by combining a target image with a template image. A template image suited to the target image is found when generating the composite image.

The user of the smartphone 1 applies an image display command to the smartphone 1 by touching the touch-sensitive panel 5. In response, image data representing a number of images that have been stored in the memory 7 of the smartphone 1 is read from the memory 7 and these images represented by the read image data are displayed on the display screen of the display device 4 (step 31 in FIG. 4).

Figure 6:
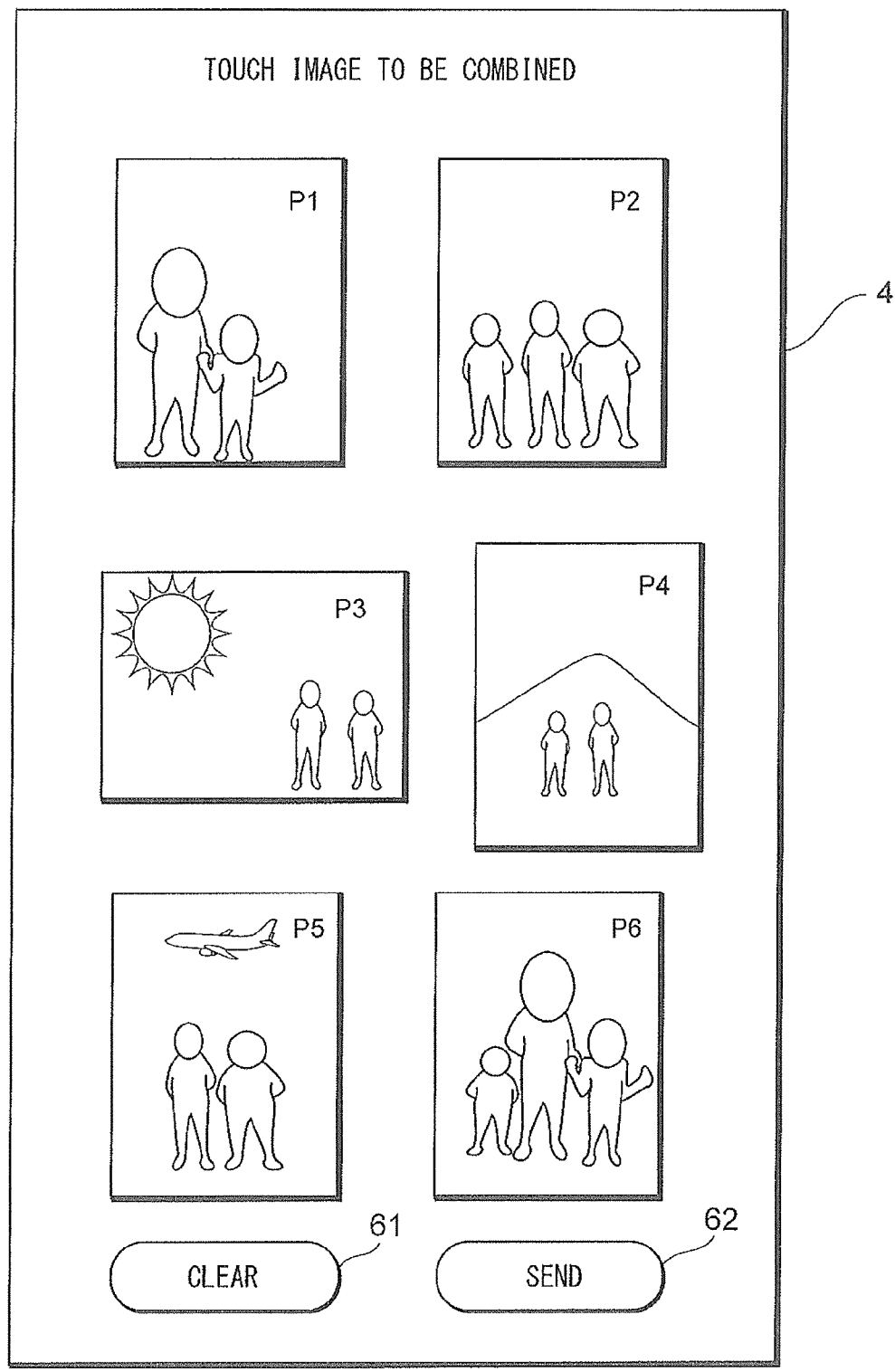
FIG. 6 is an example of a display screen of the smartphone.

FIG. 6 shows examples of a number of images (one or multiple images) being displayed on the display screen 4 (use is made of the same reference numeral as that of the display device) of the smartphone 1.

A number of images P1 to P6 are being displayed on the display screen 4. It goes without saying that images not being displayed on the display screen 4 can also be displayed on the display screen 4 by scrolling. Formed on the lower portion of the display screen 4 are a clear button 61 on which characters reading "CLEAR" are being displayed, and a send button 62 on which characters reading "SEND" are being displayed.

From among the number of images being displayed on the display screen 4, the user selects a target image by touching an image that is to be combined with a template image (step 31 in FIG. 4). In a case where the user wishes to change the selected target image, the user touches the clear button 61. In response, the selection of the image is cancelled and image selection can be performed again. If the user touches the send button 62 after selecting the image, image data representing the selected target image is sent from the smartphone 1 to the image combining server 20 (step 33 in FIG. 4). Here it is assumed that image P1 has been selected as the target image.

When image data representing the target image P1 sent from the smartphone 1 is received by the image combining server 20 (step 41 in FIG. 4), the target image P1 represented by the received image data is analyzed by the CPU 21 (step 42 in FIG. 4). As a result of this analysis, the CPU 21 of the image combining server 20 (target image analysis information acquisition means) acquires target image analysis information that includes at least two items from among brightness, contrast, saturation, hue, color balance and spatial frequency of the target image that is to be combined with a template image. Acquired target image analysis information is stored, per target image, in the memory 22 in the form of a target image analysis information table.

FIG. 7, which illustrates the result of analyzing the target image, is a target image analysis information table.

The target image analysis information table stores target image analysis information for every target image. In FIG. 7, brightness, contrast, saturation, hue, color balance and spatial frequency are all analyzed as target image analysis information of the target image P1. These will have been stored in the table. Naturally, even if all of these items of target age analysis information are not acquired, it will suffice if at least two items of target image analysis information are acquired by the image combining server 20.

With reference again to FIG. 4, when the target image analysis information is acquired, the impression given by the target image (the feeling the observer of the target image derives from the target image, such as whether the target image is cute, gentle, invigorating or pretty) is determined by the CPU 21 (first target image impression determination means) based upon the target image analysis information acquired (step 43). One or multiple impressions may be determined.

FIG. 8 is an example of a table illustrating impressions versus image analysis information.

The table illustrating impressions versus image analysis information determines the impression from the image analysis information and will have been stored in the memory 22 of the image combining server 20.

Impression is defined in conformity with values such as brightness, which is image analysis information. For example, the impression given by a target image is determined to be "CUTE" when its brightness is equal to or greater than a certain level L7, its contrast falls within a predetermined range of levels L3 to L5, its saturation falls within a predetermined range of levels L3 to L5, and other items of image analysis information such as hue also fall within the ranges shown in FIG. 8. The other impressions given are determined in a similar manner.

The table illustrating impressions versus image analysis information also includes scenes as image analysis information. However, in a case where image analysis information contained in the table illustrating impressions versus image analysis information does not exist in the acquired image analysis information, the impression given by a target image is determined utilizing only the image analysis information that exists.

With reference again to FIG. 4, template image analysis information is read by the CPU 21 (step 44).

FIG. 9 is an example of a template image analysis information table.

Template image analytical information will have been stored in the memory 22 in the form of the table shown in FIG. 9. This template image analysis information table is read by the CPU 21.

Impressions given by templates and the template image analysis information will have been stored in the template image analysis information table in correspondence with template numbers that identify template images. In a case where a template image gives multiple impressions, multiple impressions will have been stored in the template image analysis information table.

With regard to items of image analysis information of the same type, the CPU 21 of the image combining server 20 compares, in Template No. order, target image analysis information obtained by analyzing the target image and template image analysis information contained in the template image analysis information table. Based upon the comparison, the CPU 21 calculates a first degree of resemblance between first target image analysis information in the target image analysis information acquired by the CPU 21 (target image analysis information acquisition means) and first template image analysis information, which is of a type identical with that of the first target image analysis information, in template image analysis information consisting of the brightness, contrast, saturation, hue, color balance and spatial frequency of the template image. This degree of resemblance is high if the items of first target image analysis information and first template image analysis information are close to each other and is low if they are remote from each other. If the items of first target image analysis information and first template image analysis information agree, then the degree of resemblance is highest. With regard to image analysis information that can be specified by a single value, as is the case with brightness, contrast, saturation and spatial frequency, the percentage of agreement between the first target image analysis information and first template image analysis information is adopted as the first degree of resemblance. Further, the percentage of agreement between second target image analysis information and second template image analysis information is adopted as a second degree of resemblance.

By way of example, if the value of target image analysis information (e.g., the brightness value of the target image) and the value of template image analysis information (the brightness value of the template image) agree, then the degree of resemblance is 100%. If the value of template image analysis information falls within ±10% of the value of target image analytical information, then the degree of resemblance is 90%. Similarly, if the value of template image analysis information falls within a range of ±20% to 10% of the value of target image analytical information, then the degree of resemblance is 80%. The same holds for other cases as well. With regard to image analysis information that cannot be specified by a single value, as is the case with hue, the average value of the hue of the target image becomes the target image analytical information of hue and the average value of the hue of the template image becomes the template image analysis information of hue, by way of example. The degree of resemblance as to whether these average values of hue are similar or not is calculated. With regard to image analysis information that cannot be specified by a single value with regard also to color balance, the degree of agreement between image analysis information (average value of color balance) and template image analysis information (average value of color balance) concerning each of the colors red, blue and green (cyan, magenta and yellow) is adopted as the degree of resemblance.

When the degree of resemblance between template image analysis information and target image analytical information is obtained for every template image, the CPU 21 determines whether the first degree of resemblance between first target image analysis information in the target image analysis information and the first template image analysis information, which is of a type identical with that of the first target image analysis information, in the template image analysis information is equal to or greater than a first threshold value (e.g., whether the first degree of resemblance is equal to or greater than 80%) (step 45 in FIG. 4). If the first degree of resemblance is equal to or greater than the first threshold value ("YES" at step 45 in FIG. 4), then the CPU 21 determines whether a second degree of resemblance is less than a second threshold value (e.g., whether the second degree of resemblance is less than 60%) (step 46 in FIG. 4). The second degree of resemblance is the resemblance between second target image analytical information, which is other than the first target image analytical information, in the target image analytical information, and second template image analysis information, which is other than the first template image analysis information in the template image analysis information and which is of a type identical with that of the second target image analytical information.

If the second degree of resemblance is less than the second threshold value ("YES" at step 46 in FIG. 4), then it is determined whether the impression given by the template image, for which the first degree of resemblance is equal to or greater than the first threshold value and, moreover, the second degree of resemblance is less than the second threshold value, is identical with the impression given by the target image (step 47 in FIG. 4). If the impressions are identical ("YES" at step 47 in FIG. 4), then the CPU 21 (template image determination means) determines that such a template image is a template image candidate (step 48 in FIG. 5).

The processing from step 44 in FIG. 4 to step 48 in FIG. 5 is repeated until a fixed number of template image candidates are obtained (step 49 in FIG. 5).

Figure 10:
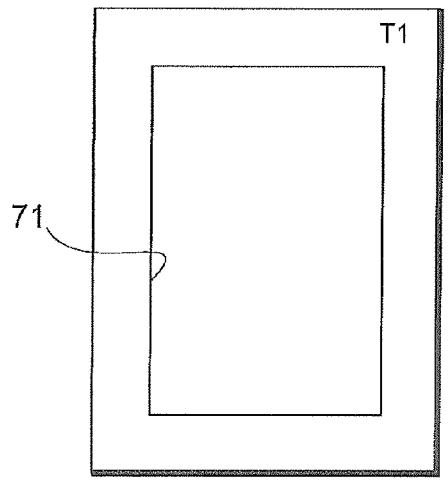
FIG. 10 shows examples of template image candidates.
Figure 10:
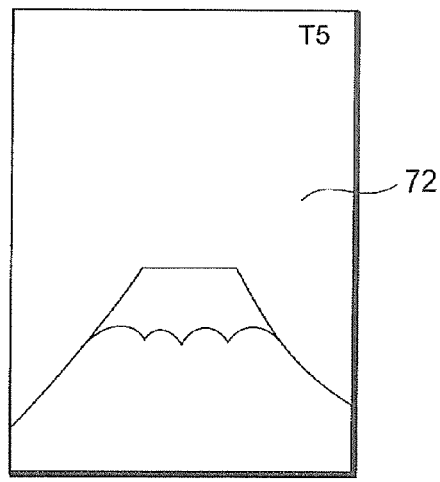
Figure 10:
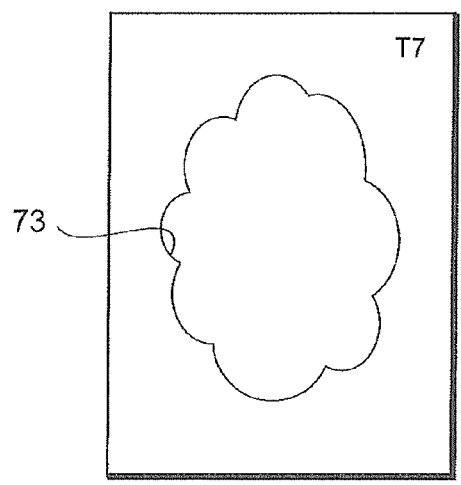
Figure 10:
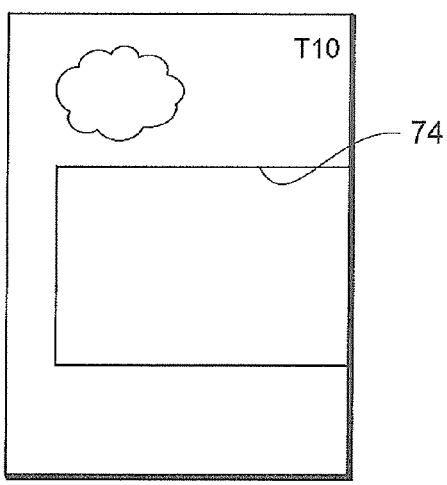
Figure 10:
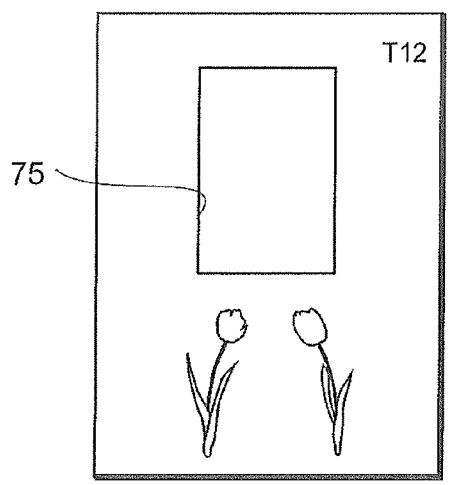
Figure 10:
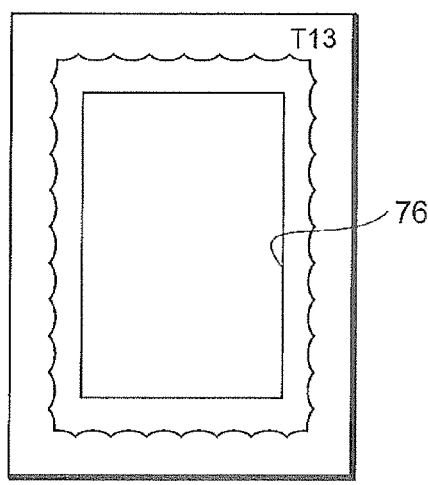

FIG. 10 shows examples of template image candidates obtained in the manner described above.

In this embodiment, six template images T1, T5, T7, T10, T12 and T13 having Template Image Nos. 1, 5, 7, 10, 12 and 13, respectively, are assumed to be template image candidates. It goes without saying that more than six (or less than six) template images may be adopted as template image candidates.

Combining areas (pasting areas) 71, 72, 73, 74, 75 and 76 with which a target image is to be combined have been formed in the template images T1, T5, T7, T10, T12 and T13, respectively. In template images T1, T7, T12 and T13, single frames have been formed surrounding the combining areas 71, 73, 75 and 76, respectively, and since the frames have been formed surrounding the combining areas 71, 73, 75 and 76, the combining areas 71, 73, 75 and 76 are closed. On the other hand, frames have not been formed surrounding the combining areas 72 and 74 of the template images T5 and T10, and the combining areas 72 and 74 are open at least at a portion of the periphery thereof. A double frame (or more frames) may just as well be formed surrounding the combining areas as a matter of course.

When a fixed number of template image candidates are obtained, the CPU 21 (combining means) of the image combining server 20 causes the target image to be combined with the combining areas of the respective template images that are candidates (step 50 in FIG. 5). Image data representing the composite images obtained by combining the target image with the combining areas of the template image candidates is sent from the image combining server 20 to the smartphone 1 (step 51 in FIG. 5).

When the image data sent from the image combining server 20 is received by the smartphone 1 (step 34 in FIG. 5), the composite images are displayed on the display screen of the smartphone 1 (step 35 in FIG. 5).

Figure 11:
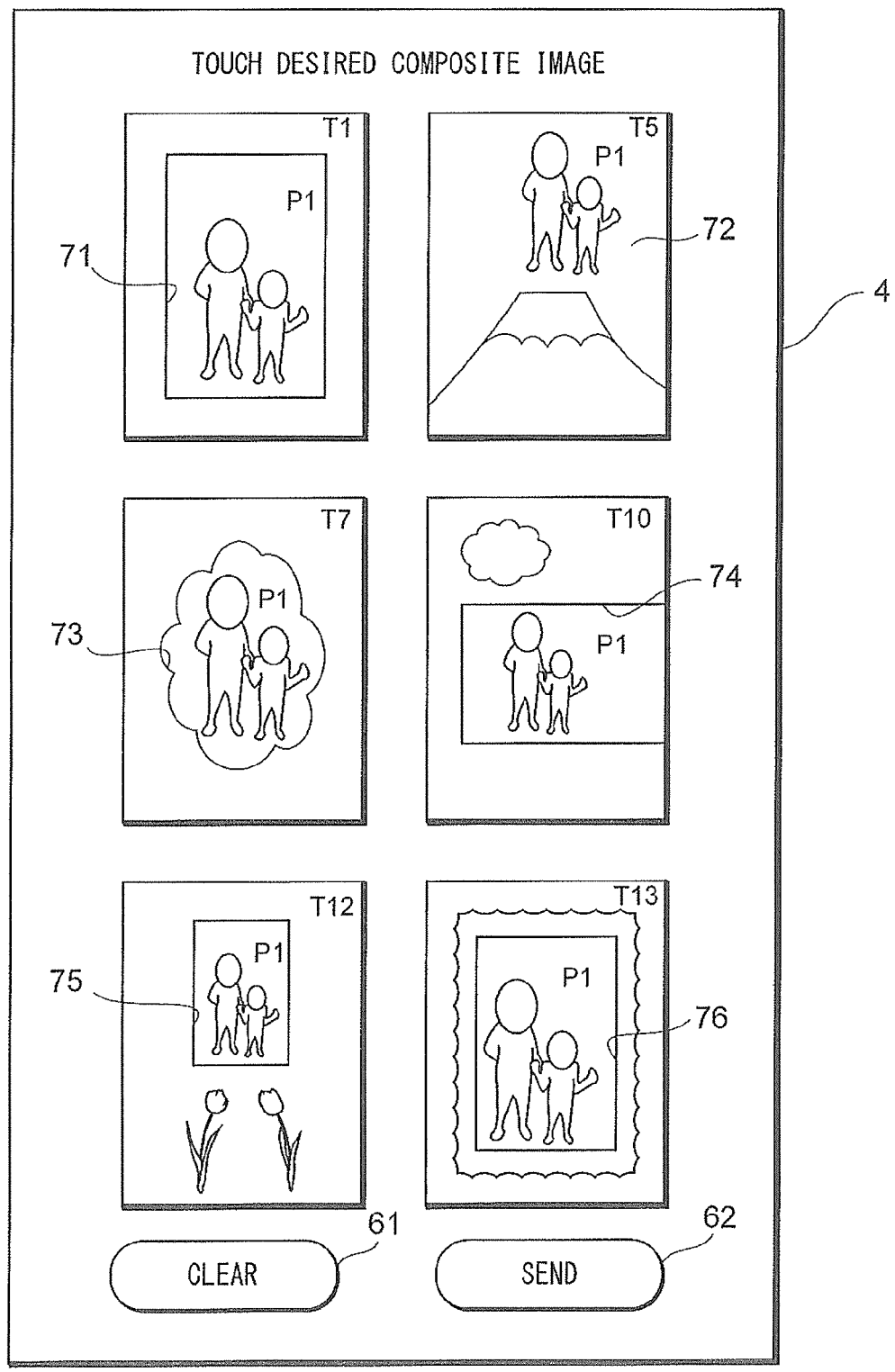
FIG. 11 is an example of a display screen of the smartphone.

FIG. 11 shows examples of composite images displayed on the display screen 4 of the smartphone 1.

The composite images are being displayed on the display screen 4. As described above, the composite images are obtained by combining the target image P1 with the combining areas 71, 72, 73, 74, 75 and 76 of the candidate template images T1, T5, T7, T10, T12 and T13, respectively.

The user views the composite images being displayed on the display screen and touches the desired composite image to thereby select this composite image (step 36 in FIG. 5). The clear button 61 is touched if the selection of the composite image is to be changed. In response, the selection of the composite image is cancelled. If the send button 62 is touched, the Template Image No. (template image identification data) being utilized by the selected composite image is sent from the smartphone 1 to the image combining server 20 (step 37 in FIG. 5).

When the Template Image No. sent from the smartphone 1 is received by the image combining server 20 (step 52 in FIG. 5), the impression that corresponds to the received Template Image No. is read from the template image analysis information table. The target image is corrected by the CPU 21 (target image correction means) so as to more closely resemble the read impression (step 53 in FIG. 5).

FIG. 12 is an example of a table illustrating impressions versus corrections.

Correction values of image analysis information will have been stored in the impression vs. correction table for every impression given by the template images. For example, if the impression given by a template image to be utilized in a composite image selected by the user is "CUTE", then the levels of such items as the brightness, contrast and saturation of the target image to be combined with this template image are each raised by one. If multiple impressions given by a template image have been defined, then an averaging correction is applied to the corrections corresponding to these multiple impressions. With regard also to items such as hue and color balance, correction methods and values corresponding to the impressions are defined and the target image is corrected by these correction methods and values.

When a target image is corrected, the composite image that includes the corrected target image is printed by the printer 29 (step 54 in FIG. 5). As a result, a postcard in which the target image has been combined with the template image is obtained.

In the foregoing embodiment, whether a template image gives an impression identical with the impression given by a target image is determined in a case where a template image candidate is decided (step 47 in FIG. 4). However, this determination is not necessarily required. Further, it is not necessarily required to correct a target image (step 53 in FIG. 5) in such a manner that the target image will more closely resemble the impression given by the template image. Furthermore, it may be arranged so that the correction processing of step 53 in FIG. 5 is executed between step 49 and step 50 in FIG. 5, with the corrected image being displayed to the user.

Figure 13:
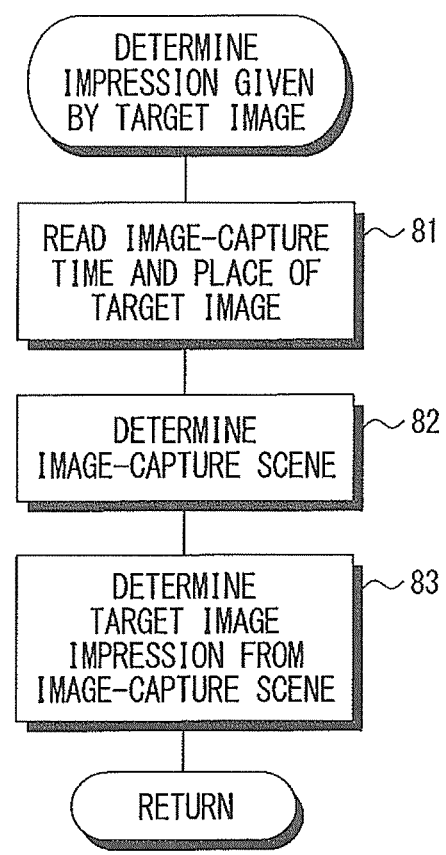
FIG. 13 is a flowchart illustrating processing for determining the impression given by a target image.

FIG. 13 is a flowchart illustrating processing (the processing of step 43 in FIG. 5) for determining an impression given by a target image.

The time and place at which the target image was captured will have been stored in the header of the image data (image file) representing the target image, and these are read by the CPU 21 of the image combining server 20 (target image information acquisition means) (step 81). The image-capture scene of the target image is determined from the read time and place at which the target image was captured (step 82). It will suffice if at least one of image-capture time and place is read.

FIG. 14 is an example of a scene determination table.

The scene determination table stores image-capture scenes that have been determined from image-capture time and place.

If the time and place at which a target image was captured are known, the weather conditions at this time and place can be ascertained and the image-capture scene can therefore be determined by the CPU 21 from these weather conditions. For example, if "July 31, 12:00, 2014" and "Mt. Fuji" were the image-capture time and place, respectively, then it can be ascertained that the weather was "FAIR" and it is determined from such weather that the image-capture scene was a fair image-capture scene. The image-capture scene is determined from among predetermined scenes, and the weather itself may be adopted as the image-capture scene or an item determined from the weather may be adopted as the image-capture scene. The image-capture scene determined is stored in the scene determination table. The scene determination table is stored in the memory 22 of the image combining server 20.

When the image-capture scene is determined, one or multiple impressions given by the target image are determined by the CPU 21 (third target image impression determination means) from the determined image-capture scene by utilizing the impression vs. image analysis information table shown in FIG. 8 (step 83). Naturally, rather than determining the impression of a target image from the image-capture scene, one or multiple impressions given by the target image may be determined by the CPU 21 (second target image impression determination means) from at least one of the image-capture time and place.

Figure 15:
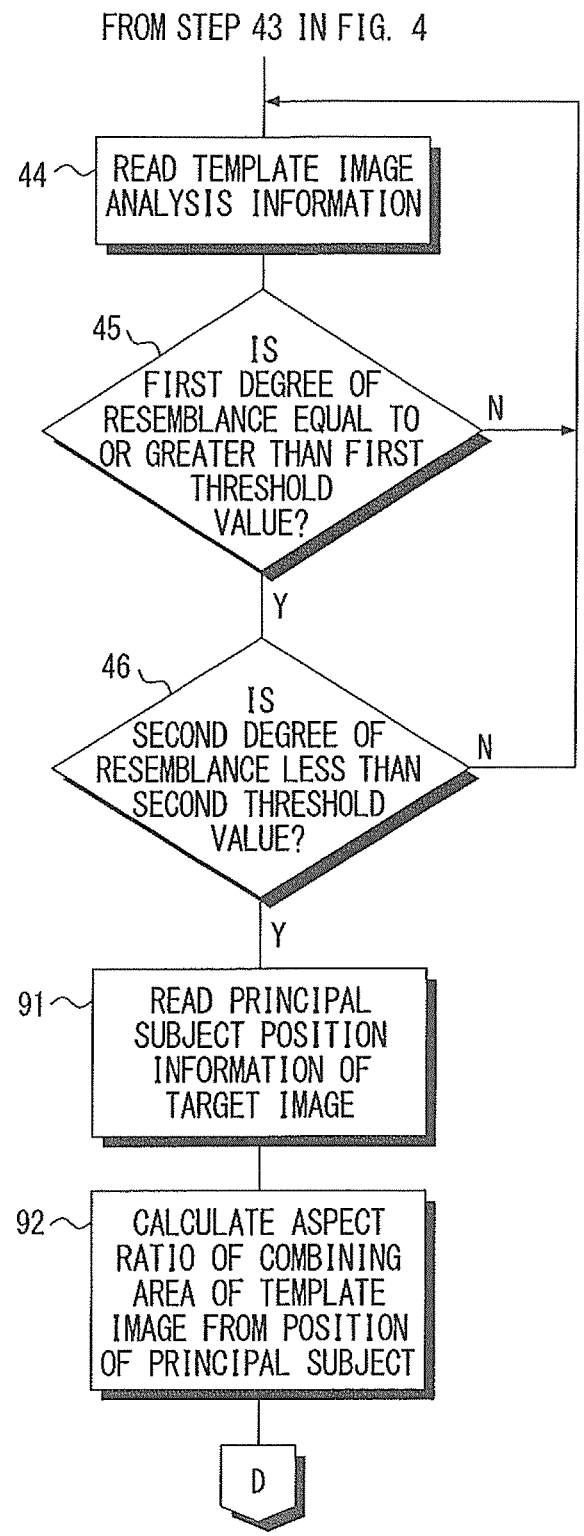
FIGS. 15 and 16 are flowcharts illustrating a portion of processing executed by an image combining server.
Figure 16:
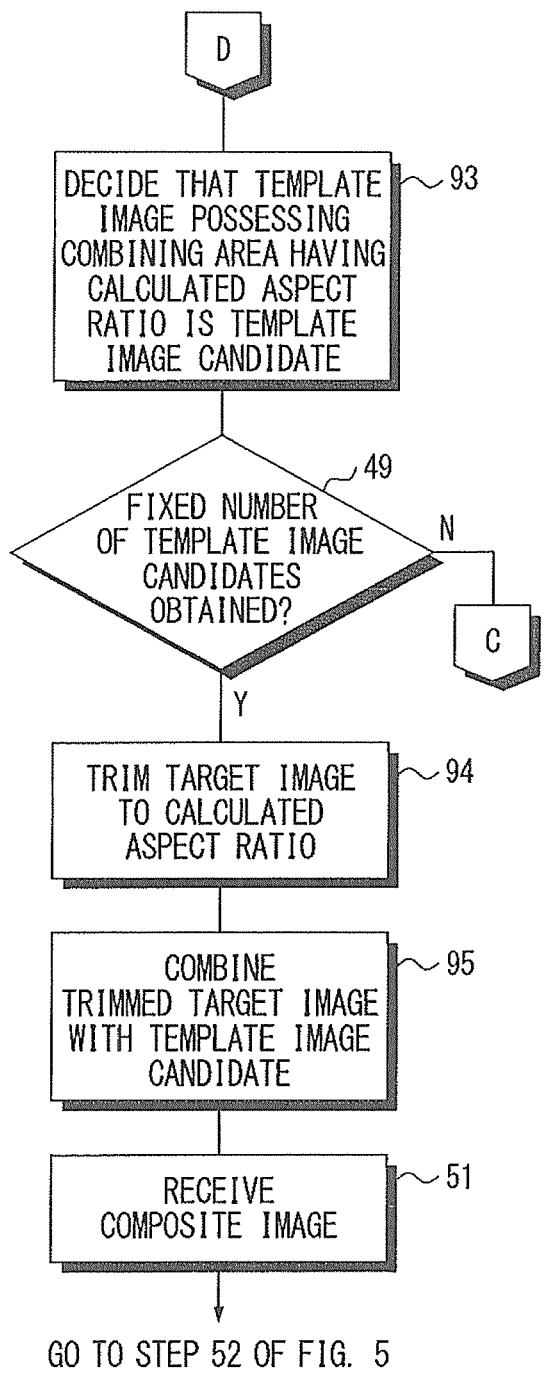

FIGS. 15 and 16 are flowcharts illustrating a portion of the processing executed by the image combining server 20. Processing steps in FIGS. 15 and 16 identical with those shown in FIG. 4 or 5 are designated by like step numbers and need not be described again.

The template image analysis information is read (step 44), as described above, and when the first degree of resemblance is equal to or greater than the first threshold value (step 45) and the second degree of resemblance is less than the second threshold value (step 46), the CPU 21 (principal subject image information acquisition means) reads principal subject position information that has been stored in the header of the image data (image file) representing the target image (step 91). The position of the principal subject included in the target image is ascertained owing to the principal subject position information.

Figure 17:
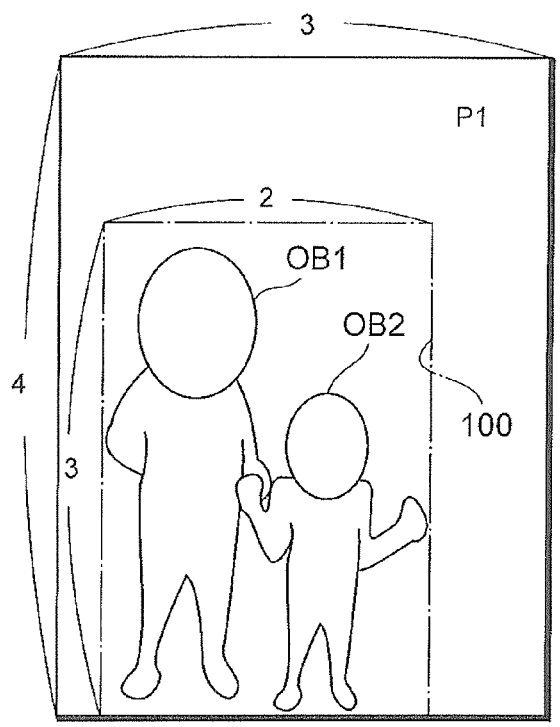
FIG. 17 is an example of a target image.

FIG. 17 illustrates the target image P1.

The target image P1 includes principal subjects OB1 and OB2. An area 100 for when the principal subjects OB1 and OB2 are to be trimmed is detected by the CPU 21 from the positions of the principal subjects OB1 and OB2 relative to the overall target image P1. Assume that the aspect ratio of the area 100 was as follows: vertical length:horizontal length=3:2. This aspect ratio of the area 100 is calculated as the combining area of the template image (step 92). A template image possessing a combining area (approximated) having the calculated aspect ratio is decided upon as a template image candidate (step 93).

Figure 18:
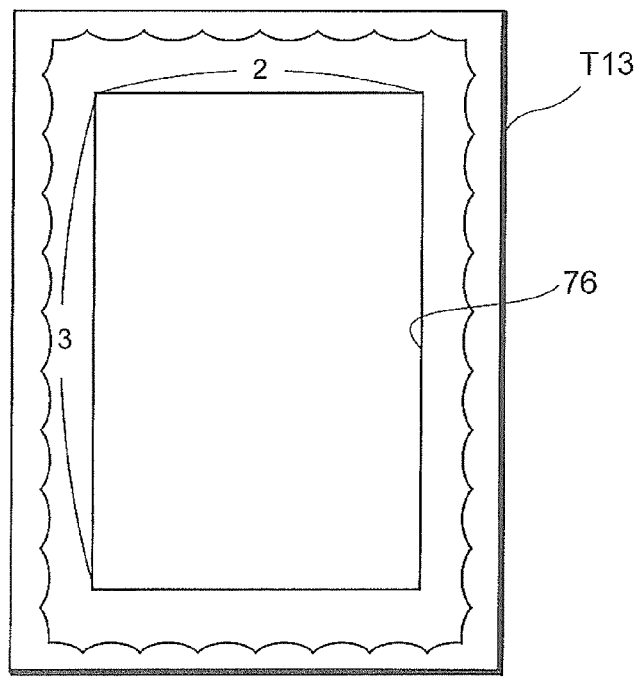
FIG. 18 is an example of a template image.

FIG. 18 is an example of a template image.

The combining area 76 has been defined in the template image T13. The aspect ratio of the combining area 76 is: vertical length:horizontal length=3:2. The template image T13 is found as a candidate having the same aspect ratio as that of the area 100 mentioned above.

When a fixed number of template image candidates are obtained ("YES" at step 49), the area 100 containing the principal subjects OB1 and OB2 as mentioned above and having the determined aspect ratio is trimmed from the target image P1 by the CPU 21 (trimming means) (step 94). The target image P1 trimmed to the area 100 is combined with the combining area of the template image found as the candidate (step 95). The image data representing the resulting composite image is sent from the image combining server 20 to the smartphone 1 as described above (step 51).

In the foregoing embodiment, a target image is analyzed in the image combining server 20 and target image analytical information is acquired. However, it may be arranged so that image data (an image file) in which the target image analytical information has been stored in the header or the like is sent to the image combining server 20.

As many apparently widely different embodiments of the present disclosure can be made without departing from the spirit and scope thereof, it is to be understood that the disclosure is not limited to the specific embodiments thereof except as defined in the appended claims.

What is claimed is:

1. An image combining apparatus, comprising:
   a target image analysis information acquisition device for acquiring target image analysis information which includes at least two items from among brightness, contrast, saturation, hue, color balance and spatial frequency of a target image to be combined with a template image;
   a template image detection device for finding a template image for which a first degree of resemblance is equal to or greater than a first threshold value, wherein the first degree of resemblance is resemblance between first target image analysis information in the target image analysis information acquired by said target image analysis information acquisition device and first template image analysis information, which is of a type identical with that of the first target image analysis information, in template image analysis information consisting of brightness, contrast, saturation, hue, color balance and spatial frequency of the template image, and moreover for which a second degree of resemblance is less than a second threshold value, wherein the second degree of resemblance is resemblance between second target image analysis information in the target image analysis information acquired by said target image analysis information acquisition device and second template image analysis information, which is of a type identical with that of the second target image analysis information, in the template image analysis information;

a combining device for combining the target image with the template image found by said template image detection device; and a first target image impression determination device for determining one or multiple impressions given by the target image based upon the target image analysis information acquired by said target image analysis information acquisition device;

wherein said template image detection device finds a template image for which the first degree of resemblance is equal to or greater than the first threshold value, the second degree of resemblance is less than the second threshold value and, moreover, which gives the impression determined by said first target image impression determination device.

2. The image combining apparatus according to claim 1, further comprising:

an image-capture information acquisition device for acquiring image-capture information which is at least one of image-capture time or image-capture place of the target image; and a second target image impression determination device for determining one or multiple impressions given by the target image, based upon the image-capture information acquired by said image-capture information acquisition device;

wherein said template image detection device finds a template image for which the first degree of resemblance is equal to or greater than the first threshold value, the second degree of resemblance is less than the second threshold value and, moreover, which gives the impression determined by the second target image impression determination device.

3. The image combining apparatus according to claim 1, further comprising:

an image-capture information acquisition device for acquiring image-capture information which is at least one of image-capture time or image-capture place of the target image;

an image-capture scene determination device for determining an image-capture scene based upon the image-capture information acquired by said image-capture information acquisition device; and a third target image impression determination device for determining one or multiple impressions given by the target image, based upon the image-capture scene determined by said image-capture scene determination device;

wherein said template image detection device finds a template image for which the first degree of resemblance is equal to or greater than the first threshold value, the second degree of resemblance is less than the second threshold value and, moreover, which gives the impression determined by said third target image impression determination device.

4. The image combining apparatus according to claim 1, further comprising:

a target image correction device for subjecting the target image to a correction that causes the target image to approximate the impression of the template image detected by said template image detection device.

5. The image combining apparatus according to claim 4, wherein a correction method is decided beforehand in conformity with the impression given by the template image detected by said template image detection device; and said target image correction device subjects the target image to a correction by the correction method decided beforehand in conformity with the template image detected by said template image detection device.

6. The image combining apparatus according to claim 1, further comprising:

a principal subject image information acquisition device for acquiring information representing position of a principal subject in the target image; and an aspect ratio calculation device for calculating aspect ratio of a combining area of the template image from the position of the principal subject represented by the principal subject image position information acquired by said principal subject image information acquisition device;

wherein said template image detection device finds a template image for which the first degree of resemblance is equal to or greater than the first threshold value, the second degree of resemblance is less than the second threshold value and, moreover, which has a combining area having the aspect ratio calculated by said aspect ratio calculation device.

7. The image combining apparatus according to claim 6, further comprising:

a trimming device for trimming the target image to the aspect ratio calculated by said aspect ratio calculation device;

wherein said combining device combines the target image, which has been trimmed by said trimming device, with the combining area of the template image found by said template image detection device.

8. The image combining apparatus according to claim 1, wherein said template image detection device finds a template image from among template images in which a combining area with which the target image is to be combined has been formed within a single frame or from among template images in which at least a portion of the periphery of a combining area with which the target image is to be combined is open.

9. An image combining method, comprising steps of:

acquiring target image analysis information which includes at least two items from among brightness, contrast, saturation, hue, color balance and spatial frequency of a target image to be combined with a template image;

finding a template image for which a first degree of resemblance is equal to or greater than a first threshold value, wherein the first degree of resemblance is resemblance between first target image analysis information in the acquired target image analysis information and first template image analysis information, which is of a type identical with that of the first target image analysis information, in template image analysis information consisting of brightness, contrast, saturation, hue, color balance and spatial frequency of the template image, and moreover for which a second degree of resemblance is less than a second threshold value, wherein the second degree of resemblance is resemblance between second target image analysis information in the acquired target image analysis information and second template image analysis information, which is of a type identical with that of the second target image analysis information, in the template image analysis information; and combining the target image with the template image found, the image combining method further comprising:
a first target image impression determination step for determining one or multiple impressions given by the target image based upon the target image analysis information acquired by said target image analysis information acquisition step;
wherein said template image detection step finds a template image for which the first degree of resemblance is equal to or greater than the first threshold value, the second degree of resemblance is less than the second threshold value and, moreover, which gives the impression determined by said first target image impression determination step.

10. A non-transitory computer readable medium storing a computer-readable program capable of controlling a computer of an image combining apparatus, said computer-readable program controlling the computer of the image combining apparatus so as to:
acquire target image analysis information which includes at least two items from among brightness, contrast, saturation, hue, color balance and spatial frequency of a target image to be combined with a template image;
find a template image for which a first degree of resemblance is equal to or greater than a first threshold value, wherein the first degree of resemblance is resemblance between first target image analysis information in the acquired target image analysis information and first template image analysis information, which is of a type identical with that of the first target image analysis information, in template image analysis information consisting of brightness, contrast, saturation, hue, color balance and spatial frequency of the template image, and moreover for which a second degree of resemblance is less than a second threshold value, wherein the second degree of resemblance is resemblance between second target image analysis information in the acquired target image analysis information and second template image analysis information, which is of a type identical with that of the second target image analysis information, in the template image analysis information; and
combine the target image with the template image found, said computer-readable program further controlling the computer of the image combining apparatus so as to:
performs a first target image impression determination step for determining one or multiple impressions given by the target image based upon the target image analysis information acquired by said target image analysis information acquisition step;
wherein said template image detection step finds a template image for which the first degree of resemblance is equal to or greater than the first threshold value, the second degree of resemblance is less than the second threshold value and, moreover, which gives the impression determined by said first target image impression determination step.

* * * * *